United States Patent [19]

Heagerty

[11] Patent Number: 4,680,864

[45] Date of Patent: Jul. 21, 1987

[54] DRAWING GUIDE

[76] Inventor: Michael S. Heagerty, 15133 Brackett Creek Rd., Bozeman, Mont. 59715

[21] Appl. No.: 911,887

[22] Filed: Sep. 26, 1986

[51] Int. Cl.[4] ........................... B43L 9/00; G01B 3/12

[52] U.S. Cl. ....................................... 33/26; 33/27.03; 33/27.05; 33/32.2; 33/36; 33/141.5

[58] Field of Search ...................... 33/26, 27.01, 27.02, 33/27.03, 27.05, 27.06, 32.2, 32.3, 35, 36, 18.1, 37, 38, 449, 485, 141 R, 141.5; 30/306, 307, 164, 95, 263, 265, 292, 319, 231, 379

[56] References Cited

U.S. PATENT DOCUMENTS

| | | | |
|---|---|---|---|
| 569,038 | 10/1896 | Dow | 33/485 |
| 724,687 | 4/1903 | Floren | 33/32.2 |
| 2,312,136 | 2/1943 | Van Triest | 33/141 R |
| 2,325,130 | 7/1943 | Harmon | 33/141 R |
| 2,543,009 | 2/1951 | Frost | 33/26 |

FOREIGN PATENT DOCUMENTS

| | | | |
|---|---|---|---|
| 171386 | 5/1906 | Fed. Rep. of Germany | 33/27.05 |
| 336843 | 5/1921 | Fed. Rep. of Germany | 33/27.05 |
| 381836 | 9/1923 | Fed. Rep. of Germany | 33/27.05 |
| 1035135 | 7/1966 | United Kingdom | 33/27.05 |

*Primary Examiner*—Charles Frankfort
*Assistant Examiner*—Patrick R. Scanlon
*Attorney, Agent, or Firm*—Lee. R. Schermerhorn

[57] ABSTRACT

A first body part having a rubber rim wheel and a second body part having a rubber rim wheel are interconnected by a vertical hinge. The first body part has a pencil holder between its wheel and the hinge and the wheels have distance measurement scales. An angle measurement scale is provided for the hinge.

10 Claims, 6 Drawing Figures

DRAWING GUIDE

BACKGROUND OF THE INVENTION

This invention relates to a drawing guide for drawing straight lines, arcs and straight lines at an angle to a base line without the usual T-square, triangles and compass.

A very simple form of instrument is provided to accomplish those three functions. Instruments heretofore proposed for such purposes have been too complicated and expensive to manufacture to be of practical value.

SUMMARY OF THE INVENTION

The present drawing guide comprises essentially two main parts, a first body part and a second body part to be grasped in the hand. These two body parts are connected together by a vertical pivot having a clamp nut to hold them in desired angular relationship. The first body part holds a pencil and each body part is equipped with a wheel.

The wheels have rubber rims to maintain traction with the drawing paper and the wheels are calibrated to measure the length of line being drawn. The pivotal connection between the two body parts includes an arcuate scale for setting them at a predetermined angle relative to each other.

The invention will be better understood and additional features and advantages will become apparent from the following description of the preferred embodiment illustrated in the accompanying drawings. Various changes may be made in the details of construction and arrangement of parts, and certain features may be used without others. All such modifications within the scope of the appended claims are included in the invention.

DESCRIPTION OF THE PREFERRED EMBODIMENT

Figure 1:
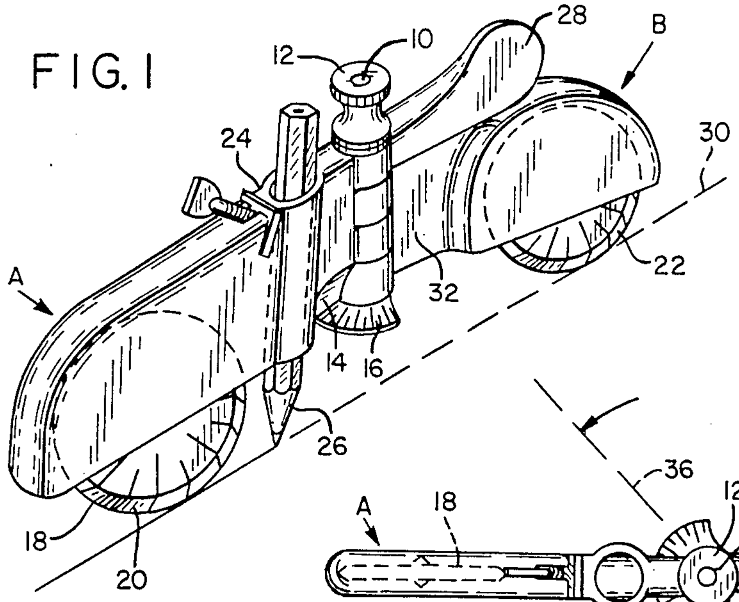
FIG. 1 is an isometric view of the drawing guide.

The drawing guide comprises a first body part A and a second body part B, hingedly connected together by a pivot pin 10 having a hinge nut 12 to clamp the two parts in a desired angular relation. This angular relation is measured by a narrow tapered edge 14, forming a pointer on the end of body part A which is positioned over an arcuate scale 16, on the adjacent end of body part B concentric with pivot pin 10. Scale 16 is marked on its opposite sides so that it may be read from either the top or bottom side of the instrument.

Body part A rolls on a wheel 18 calibrated in inches and having a rubber rim 20. Body part B rolls on a wheel 22 similar to the wheel 18. Wheel 18 is calibrated with markings on its opposite sides to measure distance of travel to the right in FIGS. 1 and 2 and wheel 22 is calibrated with markings on its opposite sides to measure distance of travel to the left.

Body part A is equipped with a pencil holder 24 for a pencil 26 or other marking instrument. Body part A has a guide lever 28 overhanging the body part B to assist in adjusting the angular relationship of the two body parts.

Figure 2:
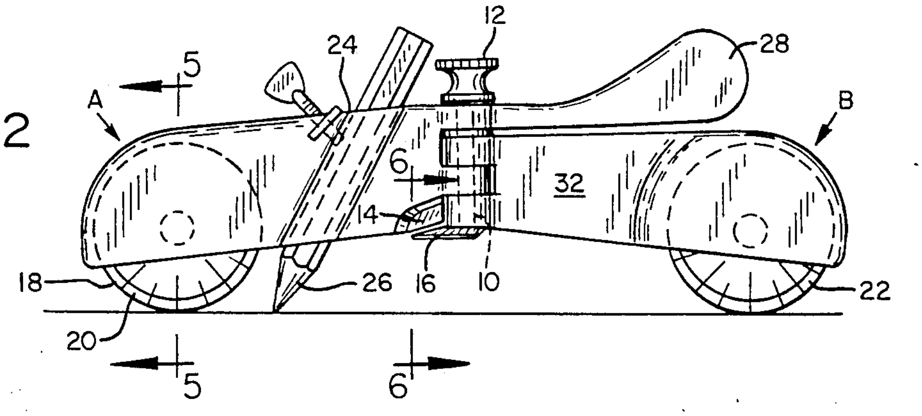
FIG. 2 is a side elevation view.
Figure 4:
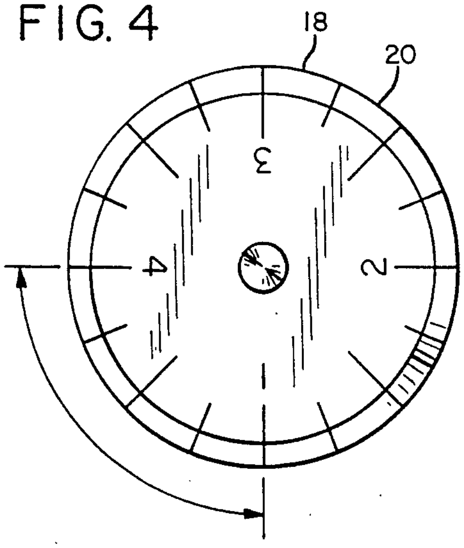
FIG. 4 is a side elevation view of a wheel.
Figure 5:
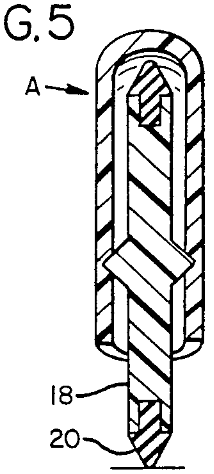
FIG. 5 is a view on the line 5—5 in FIG. 2.
Figure 6:
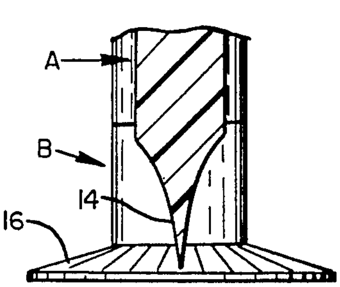
FIG. 6 is a view on the line 6—6 on FIG. 2.

When pointer 14 is set at zero on arcuate scale 16, the instrument will draw a straight line as indicated at 30 in FIG. 1. When body parts A and B are not in alignment, the instrument draws an arc.

For drawing lines at an angle to base line 30, the dial 16 is calibrated on an angular scale. In performing this operation the instrument is first placed on base line 30 as shown in FIG. 1. Holding part B in place with one hand, part A is rotated on pivot 10 to the desired angular reading on scale 16, while lifting front wheel 18 slightly off its supporting surface. Then part A is held in this new angular position and part B is lifted and turned to align with part A, and hinge nut 12 is clamped. The instrument is now in position for drawing a straight line at a desired angle to base line 30.

Figure 3:
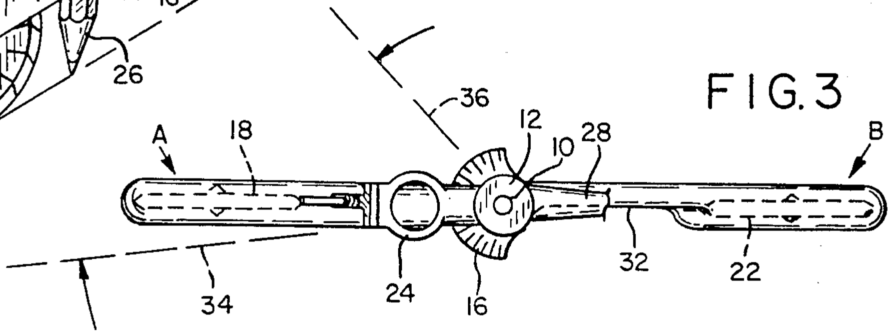
FIG. 3 is a top plan view.

Part B is narrowed in the region 32 to facilitate folding the instrument when it is not in use. This allows part B to swing about 170° clockwise toward part A as indicated by line 34 in FIG. 3. Part B will swing about 130° counterclockwise as indicated by line 36.

What is claimed is:

1. A drawing guide comprising a narrow upstanding first body part having a single wheel with all but its lower portion enclosed therein, a second narrow upstanding body part having a single wheel with all but its lower portion enclosed therein, said wheels adapted to contact a surface to be marked, said second body part forming a handle to be grasped by one hand of the user, a vertical hinge pivotally interconnecting said two body parts, a marker holder in said first body part between its wheel and said hinge for holding a marker to mark said surface, and a narrow horizontally elongated guide lever on said first body part overhanging said second body part so as to be included in the user's grasp of said second body part.

2. A drawing guide as defined in claim 1 including a hinge nut for clamping said hinge in fixed position.

3. A drawing guide as defined in claim 1 including rubber rims on said wheels.

4. A drawing guide as defined in claim 1 including distance measurement scales on said wheels, the scales on one wheel measuring distance in one direction of movement and the scales on the other wheel measuring distance in the opposite direction.

5. A drawing guide as defined in claim 1 including an arcuate dial angle scale on said second body part coaxial with said hinge, and a pointer on said first body part adjacent said scale.

6. A drawing guide as defined in claim 5 said pointer comprising a thin fin like lower edge on said first body part.

7. A drawing guide as defined in claim 1, said second body part having a concaved side adjacent said hinge to facilitate folding the two parts together.

8. A drawing guide as defined in claim 1, said marker holder holding a marker with its marking end between said two wheels.

9. A drawing guide as defined in claim 1, said hinge comprising a pair of bearings on each of said two body parts, and a vertical pin extending through said bearings.

10. A drawing guide as defined in claim 9, the uppermost of said bearings being on said first body part and said guide lever being integral with said uppermost bearing.

* * * * *